United States Patent
Galzin

(10) Patent No.: US 10,752,365 B2
(45) Date of Patent: Aug. 25, 2020

(54) METHOD AND DEVICE FOR THERMAL CONTROL OF A PLURALITY OF CABINS OF A VEHICLE

(71) Applicant: LIEBHERR-AEROSPACE TOULOUSE SAS, Toulouse (FR)

(72) Inventor: Guillaume Galzin, Toulouse (FR)

(73) Assignee: LIEBHERR-AEROSPACE TOULOUSE SAS, Toulouse (FR)

( * ) Notice: Subject to any disclaimer, the term of this patent is extended or adjusted under 35 U.S.C. 154(b) by 22 days.

(21) Appl. No.: 15/951,200

(22) Filed: Apr. 12, 2018

(65) Prior Publication Data

US 2018/0305030 A1 Oct. 25, 2018

(30) Foreign Application Priority Data

Apr. 20, 2017 (FR) ..................................... 17.53435

(51) Int. Cl.
*B64D 13/08* (2006.01)
*B64D 13/06* (2006.01)
(Continued)

(52) U.S. Cl.
CPC ......... *B64D 13/08* (2013.01); *B60H 1/00064* (2013.01); *B60H 1/00371* (2013.01);
(Continued)

(58) Field of Classification Search
CPC ...... B64D 2013/0618; B64D 2013/064; B64D 2013/0651; B64D 2013/0662; B64D 2013/0681; B64D 2013/0688; B64D 13/08; B64D 13/06; B64D 2013/0674; B64D 2013/0655; B60H 1/00371; B60H 1/00064; B63J 2/02; Y02T 50/56
See application file for complete search history.

(56) References Cited

U.S. PATENT DOCUMENTS 3,601,185 A 8/1971 Rothman
4,209,993 A * 7/1980 Rannenberg ............. B60H 1/32
62/239
(Continued)

FOREIGN PATENT DOCUMENTS

DE 10 2013 005595 A1 10/2014
EP 0 440 400 A1 8/1991
(Continued)

OTHER PUBLICATIONS

FR Search Report, dated Dec. 4, 2017, from corresponding FR 1 753 435 application.

*Primary Examiner* — Nelson J Nieves
(74) *Attorney, Agent, or Firm* — Ipsilon USA, LLP

(57) ABSTRACT

Disclosed is a method and a device for thermally controlling a plurality of cabins of a vehicle from a mixing chamber supplied with air from at least one air supply device of which at least the temperature is controlled, each cabin being supplied with air by a supply conduit specific to this cabin. At least one cabin is supplied with air at a temperature adjusted by at least one individual exchanger associated with the supply conduit specific to this cabin, in which a second circuit is supplied with a heat transfer fluid from at least one heat transfer fluid thermal regulation loop of the vehicle. Also disclosed is a vehicle provided with at least one thermal control device.

19 Claims, 2 Drawing Sheets

Figure 1:
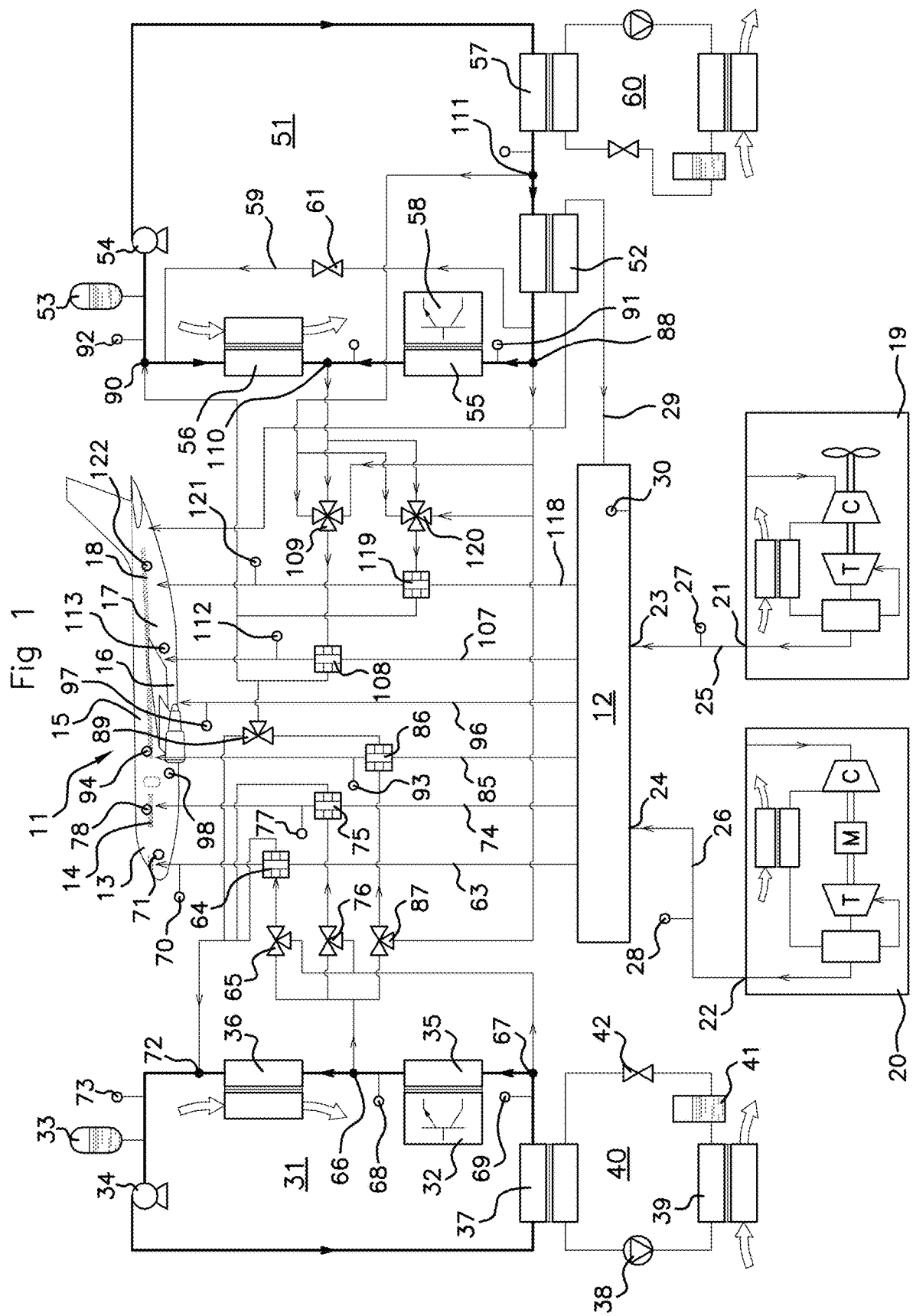

(51) Int. Cl.
  *B60H 1/00* (2006.01)
  *B63J 2/02* (2006.01)
(52) U.S. Cl.
  CPC ............... *B64D 13/06* (2013.01); *B63J 2/02* (2013.01); *B64D 2013/064* (2013.01); *B64D 2013/0618* (2013.01); *B64D 2013/0655* (2013.01); *B64D 2013/0674* (2013.01); *Y02T 50/56* (2013.01)

(56) References Cited

U.S. PATENT DOCUMENTS

| | | | |
|---|---|---|---|
| 4,327,802 A | 5/1982 | Beldam | |
| 6,216,981 B1* | 4/2001 | Helm | B64D 13/06 244/118.5 |
| 7,618,008 B2* | 11/2009 | Scherer | B64D 13/06 165/58 |
| 9,394,055 B2* | 7/2016 | Markwart | B64D 13/00 |
| 2011/0126562 A1 | 6/2011 | Dittmar et al. | |
| 2011/0240795 A1* | 10/2011 | Brugger | B64D 13/08 244/58 |
| 2013/0160472 A1 | 6/2013 | Klimpel et al. | |
| 2015/0246729 A1* | 9/2015 | Ng | B64D 13/06 454/73 |
| 2017/0060125 A1* | 3/2017 | Beaven | G05B 23/0235 |
| 2017/0160180 A1* | 6/2017 | Bezold | B64D 13/02 |
| 2017/0355466 A1* | 12/2017 | Galzin | B64D 13/06 |
| 2018/0148182 A1* | 5/2018 | Fagundes | B64D 13/06 |
| 2018/0162535 A1* | 6/2018 | Army | B64D 13/06 |
| 2018/0281977 A1* | 10/2018 | DeFrancesco | B64D 13/08 |
| 2019/0161195 A1* | 5/2019 | Bartosz | B01D 46/442 |

FOREIGN PATENT DOCUMENTS

| | | |
|---|---|---|
| EP | 0 940 336 A2 | 9/1999 |
| EP | 1 701 884 A1 | 9/2006 |

\* cited by examiner

METHOD AND DEVICE FOR THERMAL CONTROL OF A PLURALITY OF CABINS OF A VEHICLE

The invention relates to a method and a device for thermally controlling a plurality of cabins of a vehicle—in particular an aircraft. It also relates to a vehicle—in particular an aircraft—provided with at least one thermal control device in accordance with the invention.

Throughout the text, the term "cabin" denotes any interior space of a vehicle—in particular an aircraft—in which at least the temperature of the air must be controlled. It can thus equally be a passenger-accommodating area or a cockpit, a hold, a cargo-loading space . . . . The expression "thermal control/thermally controlling" denotes the act of controlling at least the temperature of the air in a cabin. The expression "thermal regulation loop" denotes any device comprising at least one closed circuit in which at least one heat transfer fluid circulates in contact with at least one cold source so as to be able to exchange calories with this cold source and in contact with at least one hot source so as to be able to exchange calories with this hot source.

The vehicles are most often provided with at least one device, named environmental control system (ECS) or device, allowing each cabin of the vehicle to be thermally controlled at least. Each cabin is supplied with air from a mixing chamber allowing in particular the mixing of recirculation air from all or some of the cabins with air delivered by each environmental control device.

In the case of aircraft in particular, the environmental control devices are most often produced on the basis of at least one air cycle machine allowing the pressure of the air to likewise be controlled. A vehicle can also be equipped with at least one liquid/gas diphasic heat transfer fluid thermal regulation loop (in particular a device named vapour cycle device (VCS)) and/or at least one monophasic heat transfer liquid thermal regulation loop, e.g. for cooling on-board equipment such as electronic power equipment and/or refrigerators, or for heating on-board equipment such as cooking ovens or the like.

Numerous propositions, especially theoretical ones, have been put forward for optimising the thermal management on board a vehicle from different cold and hot sources and different air cycle and/or vapor cycle and/or monophasic liquid cycle thermal loops available on board the vehicle.

There remains the problem of thermally controlling a plurality of cabins of a single vehicle from a single mixing chamber which is not, in practice, optimised from an energy point of view.

In fact, in the most rudimentary known systems, the output air from the mixing chamber is fed equally into the different cabins of the vehicle. However, since these different cabins have in practice different thermal needs, the temperature stabilised in each cabin is different from one cabin to the next and cannot be regulated based on a set temperature specific to each cabin.

In some known, more complex systems (cf. e.g. EP1701884), the thermal control of a plurality of cabins is effected by controlling the temperature of the air at the outlet of the mixing chamber based on the cabin having the greatest demand for cold power, each other cabin being supplied from air from the mixing chamber heated by an electric heater interposed between the mixing chamber and the cabin, or by injecting hot air from the propulsion engines of the vehicle. The temperature within each cabin can be regulated based on the thermal needs specific to each cabin, and optionally based on a set temperature specific to each cabin. Nevertheless, these known systems in which, in the cooling mode, the air initially cooled by an environmental control system is heated to adjust its temperature to the needs of at least one cabin are wasteful in terms of energy which should be avoided. In other known systems, it has been proposed to supply each cabin from an environmental control system via an injector for evaporated cooling water and an electric heater specific to each cabin. These systems likewise perform poorly in terms of energy efficiency, are complex and costly in terms of flight control software and hardware.

The invention thus aims to overcome all of these disadvantages.

It aims in particular to propose a thermal control method and device allowing each cabin of a plurality of cabins of a vehicle—in particular an aircraft—to be individually thermally controlled from a single mixing chamber under conditions of improved energy efficiency and in a simple, reliable and inexpensive manner.

It likewise aims to propose such a thermal control method and device which can operate in all the usage conditions of the vehicle, in particular in all the operating and in-flight conditions of an aircraft (on the ground, during take-off, flying at high altitude, flying at low altitude, during landing, . . . ).

It aims in particular to propose such a thermal control method and device which do not require the use of electric heaters nor injections of hot air bled from the propulsion engines of the vehicle or evaporated water in the supply conduits specific to each cabin for individually heating and/or cooling the air from the mixing chamber.

To this end, the invention relates to a method for thermally controlling a plurality of cabins of a vehicle from a mixing chamber supplied with air from at least one air supply device, at least the temperature of said air being controlled, each cabin being supplied with air:
  from the mixing chamber,
  by a supply conduit specific to this cabin,
  independently of each other cabin,
  characterised in that:
    at least one cabin is supplied with air at a temperature adjusted by at least one heat exchanger, named individual exchanger, associated with said supply conduit specific to this cabin,
    air from the mixing chamber passing through a first circuit of each individual exchanger associated with said supply conduit specific to a cabin and independently supplying said cabin, this first circuit being interposed between said cabin and the mixing chamber on said supply conduit specific to said cabin,
    at least one second circuit of at least one individual exchanger associated with a supply conduit specific to a cabin is supplied with a heat transfer fluid from at least one thermal regulation loop of the vehicle,
    this heat transfer fluid being selected:
    from:
    at least one heat transfer fluid bled from a thermal regulation loop of the vehicle at a temperature greater than the temperature of the air from the mixing chamber,
    at least one heat transfer fluid bled from a thermal regulation loop of the vehicle at a temperature lower than the temperature of the air from the mixing chamber,
    such that each individual exchanger associated with the supply conduit specific to said cabin individually adjusts the temperature of the air supplying said cabin based on a set temperature for said cabin.

The invention also relates to a device suitable for implementing a method in accordance with the invention. The invention thus likewise relates to a device for thermally controlling a plurality of cabins of a vehicle comprising:
a mixing chamber,
at least one air supply device connected to the mixing chamber for supplying same with air at a controlled temperature,
an automatic thermal management arrangement suitable for controlling at least the temperature of the air delivered by each air supply device to the mixing chamber based on at least one set temperature of at least one cabin of the vehicle,
each cabin being connected to the mixing chamber by a supply conduit specific to this cabin so as to be able to be supplied with air from the mixing chamber independently of each other cabin,
characterised in that:
at least one heat exchanger, named individual exchanger, is associated with at least one supply conduit specific to a cabin,
each individual exchanger comprises:
a first circuit interposed between said cabin and the mixing chamber on said supply conduit specific to said cabin to be able to have air from the mixing chamber pass therethrough and to supply said cabin,
a second circuit connected to at least one heat transfer fluid thermal regulation loop of the vehicle to be able to be supplied with this heat transfer fluid,
said automatic thermal management arrangement is suitable for supplying at least one second circuit of at least one individual exchanger associated with a supply conduit specific to a cabin with a heat transfer fluid from at least one thermal regulation loop of the vehicle,
said automatic thermal management arrangement is suitable for selecting this heat transfer fluid:
from:
at least one heat transfer fluid bled from a thermal regulation loop of the vehicle at a temperature greater than the temperature of the air from the mixing chamber,
at least one heat transfer fluid bled from a thermal regulation loop of the vehicle at a temperature lower than the temperature of the air from the mixing chamber,
chosen such that each individual exchanger associated with the supply conduit specific to said cabin individually adjusts the temperature of the air supplying said cabin based on a set temperature for said cabin.

The invention also relates to a thermal control method implemented in a thermal control device in accordance with the invention.

A vehicle such as an aircraft is, in general, systematically equipped with at least one heat transfer fluid thermal regulation loop—the heat transfer fluid being particularly a monophasic heat transfer fluid which can be in particular a monophasic heat transfer liquid or air—for cooling on-board equipment on board the vehicle such as electrical or electronic equipment, e.g. for cooling the power electronics. Such a monophasic heat transfer fluid thermal regulation loop is available and operational on board the vehicle in all the operating conditions—in particular flying conditions—thereof. It is associated with hot sources (equipment to be cooled, condenser of a vapour cycle diphasic loop (VCS) . . . ) and cold sources (equipment to be heated, evaporator of a vapour cycle diphasic loop (VCS), skin heat exchangers . . . ). Consequently, in a method and a device in accordance with the invention, the heat transfer fluid can be bled from such a thermal regulation loop at different temperatures according to the needs for individually adjusting the temperature of each cabin. The use of such a heat transfer fluid of a thermal regulation loop is also extremely simple, allows the use of equipment which is already on board, and thus minimises the impact in terms of weight and bulkiness of adapting the vehicle for implementing a method in accordance with the invention.

In a method and a device in accordance with the invention, said set temperature for at least one cabin of the vehicle can be in particular selected from a set temperature of the air within a cabin of the vehicle, a set temperature of the air supplying a cabin of the vehicle, a set temperature of the air within a plurality of cabins of the vehicle, a set temperature of the air supplying a plurality of cabins of the vehicle, and values determined from a plurality of these set temperatures (in particular an average value of a plurality of these set temperatures). In some preferred embodiments, said set temperature is a set temperature of the air supplying said cabin.

In accordance with the different embodiment variants which can be envisaged, there is nothing to prevent that said heat transfer fluid thermal regulation loop is wholly or partly associated with at least one air supply device of the mixing chamber. Nevertheless, in some advantageous embodiments of a method and a device in accordance with the invention, said thermal regulation loop is distinct from and independent of each air supply device of the mixing chamber.

Furthermore, the invention is applicable with all the embodiment variants which can be envisaged of an air supply device or devices of the mixing chamber. However, in some advantageous embodiments in accordance with the invention, each air supply device of the mixing chamber is an air cycle device, i.e. having at least one air cycle machine. Such an air cycle machine comprises at least one compressor and at least one turbine. At least one intermediate heat exchanger is interposed between a compressor and a turbine of such an air cycle machine. Advantageously, a water extraction loop is provided downstream of the turbine of such an air cycle machine. At least one electric motor can be associated with a compressor of such an air cycle machine.

Furthermore, the temperature of the air delivered to the mixing chamber by each air supply device can be controlled based on at least one set temperature for at least one cabin of the vehicle—in particular in accordance with a set temperature for each cabin of the vehicle. Such a set temperature for at least one cabin of the vehicle used for controlling the temperature of the air delivered to the mixing chamber can be in particular selected from a set temperature of the air within a cabin of the vehicle, a set temperature of the air supplying a cabin of the vehicle, a set temperature of the air within a plurality of cabins of the vehicle, a set temperature of the air supplying a plurality of cabins of the vehicle, and values determined from a plurality of these set temperatures (in particular an average value of a plurality of these set temperatures).

The temperature of the air delivered to the mixing chamber by each air supply device can be controlled in this manner by an automatic thermal management arrangement—in particular in accordance with a closed loop regulation. Such an automatic thermal management arrangement likewise takes into consideration the different air flow rates which can be introduced into the mixing chamber, in particular recirculation air flow rates from one and/or another of the cabins of the vehicle. Such an automatic thermal management arrangement is advantageously suitable for regulating at least the temperature of the outlet air of the mixing chamber based on at least one predetermined regulating criterion, in particular at least one set temperature for at least one cabin of the vehicle.

In a method and a device in accordance with the invention, the temperature of the air supplied in at least one cabin—in particular in each cabin—can be adjusted individually, i.e. independently of the temperature of the air supplying the other cabins, and owing to at least one simple heat exchanger supplied with heat transfer fluid at a suitable temperature.

There is nothing to prevent provision being made that at least one supply conduit specific to a cabin directly supplies the cabin with air from the mixing chamber, without an intermediate individual exchanger. For example, a cabin having the lowest thermal gain needs can be supplied directly with air from the mixing chamber, it not being necessary to individually adjust the temperature of the air supplying this cabin.

However, in some embodiments of a method in accordance with the invention, each cabin of said plurality of cabins is supplied with air at a temperature which may be adjusted by at least one individual exchanger associated with said supply conduit specific to each cabin. Similarly, in a device in accordance with the invention at least one individual exchanger is associated with each supply conduit specific to a cabin.

Furthermore, there is nothing to prevent provision being made that the temperature of the air supplying at least one cabin is individually adjusted solely in one direction with respect to the temperature of the air from the mixing chamber, for example—in the cooling mode—solely towards a decrease in temperature or—in the heating mode—solely towards an increase in temperature. However, in some preferred embodiments of the invention, the temperature of said heat transfer fluid is selected so as to be able to individually adjust the temperature of the air supplying said cabin either towards a decrease in temperature or towards an increase in temperature with respect to the temperature of the air from the mixing chamber. Therefore, advantageously and in accordance with the invention, said heat transfer fluid is selected from:

- at least one heat transfer fluid—in particular at least one heat transfer liquid—bled from a thermal regulation loop of the vehicle at a temperature greater than the temperature of the air from the mixing chamber when said set temperature for said cabin is greater than the temperature of the air from the mixing chamber,
- at least one heat transfer fluid—in particular at least one heat transfer liquid—bled from a thermal regulation loop of the vehicle at a temperature lower than the temperature of the air from the mixing chamber when said set temperature for said cabin is lower than the temperature of the air from the mixing chamber.

Said temperature of the air from the mixing chamber can be selected from a temperature measured in the mixing chamber by at least one temperature sensor and a temperature determined by calculation—in particular by said automatic thermal management arrangement.

Furthermore, in some embodiments in accordance with the invention each air supply device of the mixing chamber and said heat transfer fluid are selected and suitable such that the temperature of said heat transfer fluid and said temperature of the air from the mixing chamber are different from each other, in particular different from each other in absolute value of a difference value greater than a predetermined threshold value. This predetermined threshold value is selected in particular to ensure sufficient heat exchanges between the two circuits of each individual exchanger and is advantageously greater than 1° C., in particular between 2° C. and 10° C., e.g. of the order of 5° C. Therefore, in these embodiments, said automatic thermal management arrangement is suitable for controlling the temperature of the air delivered to the mixing chamber by each air supply device, and the supply of each second circuit supplied with heat transfer fluid such that said heat transfer fluid is supplied in the second circuit at a temperature different from the temperature of the air from the mixing chamber which is greater, in absolute value, than said predetermined threshold value.

Said automatic thermal management arrangement is thus suitable for controlling, on the one hand, each air supply device of the mixing chamber, and, on the other hand, the supply of each second circuit of each individual exchanger with a heat transfer fluid bled from a thermal regulation loop of the vehicle, on condition that this heat transfer fluid is at a temperature having a greater difference to said predetermined threshold value compared with the temperature of the air from the mixing chamber. This minimum temperature deviation between the air at the outlet of the mixing chamber and the heat transfer fluid supplied in each individual exchanger allows, in practice, efficient thermal control to be ensured without a risk of instability.

There is nothing to prevent the association of a plurality of individual exchangers to a single supply conduit specific to a cabin. For example, it is possible to provide, for a single supply conduit specific to a cabin, a first individual exchanger suitable for receiving a heat transfer fluid at a temperature greater than the temperature of the air from the mixing chamber so as to increase the temperature of the air supplying the cabin compared with the temperature of the air from the mixing chamber, and a second individual exchanger suitable for receiving a heat transfer fluid at a temperature lower than the temperature of the air from the mixing chamber so as to decrease the temperature of the air supplying the cabin compared with the temperature of the air from the mixing chamber. It is likewise possible to provide a plurality of individual exchangers associated with a single supply conduit, in particular at least one first individual exchanger suitable for effecting a rough temperature adjustment (the second circuit of such a first individual exchanger being supplied with heat transfer fluid, the characteristics of which are suitable for effecting such a rough temperature adjustment) and at least one second individual exchanger suitable for effecting precise temperature adjustment (the second circuit of such a first individual exchanger being supplied with heat transfer fluid, the characteristics of which are suitable for effecting such a precise temperature adjustment). It is likewise possible to provide a plurality of similar individual exchangers associated with a single supply conduit for redundancy purposes, in order to overcome a possible breakdown of one of these individual exchangers.

However, in some preferred embodiments at most one individual exchanger is associated with each supply conduit specific to a cabin.

In some possible embodiments, said second circuit of such a single individual exchanger associated with a supply conduit specific to a cabin can be supplied with a heat transfer fluid from a single bleed point of a single thermal regulation loop of the vehicle, i.e. at a single temperature, the adjustment of the temperature of the air supplying the cabin being possible only in one temperature varying direction, either decreasing temperature or increasing temperature compared with the temperature of the air from the mixing chamber. However, preferably said second circuit of each single individual exchanger associated with a supply conduit specific to a cabin is supplied with heat transfer fluid by means for selective supply from a bleed point selected from a plurality of bleed points of at least one thermal regulation loop of the vehicle. Said plurality of bleed points can be formed of a plurality of bleed points on a single thermal regulation loop of the vehicle or, in contrast, can comprise at least several bleed points formed on several separate thermal regulation loops of the vehicle.

Advantageously, in some embodiments in accordance with the invention the second circuit of each individual exchanger associated with a supply duct specific to a cabin is itself individually supplied with heat transfer fluid by supply means which are specific to it, i.e. independently of the supply with heat transfer fluid of each other second circuit of each individual exchanger associated with the same supply conduit or with another supply conduit (specific to another cabin). However, it is possible to provide supply means common to a plurality of second circuits of a plurality of individual exchangers associated with a single supply conduit specific to a single cabin, or common to a plurality of second circuits of a plurality of individual exchangers respectively associated with a plurality of separate supply conduits specific to a plurality of separate cabins. For example, the second circuits of a plurality of individual, rough-adjustment exchangers associated with separate supply ducts can be supplied by common supply means, i.e. by a single multi-way valve, and thus with a single heat transfer fluid.

In some embodiments in accordance with the invention, these means for supplying each second circuit with heat transfer fluid are formed of a multi-way valve—in particular a three-way valve—controlled by said automatic thermal management arrangement. Therefore, advantageously in a method in accordance with the invention each second circuit is supplied with heat transfer fluid via a multi-way valve—in particular a three-way valve—having an outlet connected to the second circuit, a first inlet connected to a first heat transfer fluid bleed point of a thermal regulation loop of the vehicle and at least one second inlet—in particular a single second inlet—connected to a second heat transfer fluid bleed point of a thermal regulation loop of the vehicle, the second bleed point being suitable for being able to deliver heat transfer fluid at a temperature different from the temperature of the heat transfer fluid which can be delivered by the first bleed point. Furthermore, advantageously and in accordance with the invention, each second circuit is supplied with heat transfer fluid via a multi-way valve—in particular a three-way valve—connected to at least two separate bleed points—in particular to two separate bleed points—for a same heat transfer fluid at distinct temperatures of a same thermal regulation loop of the vehicle.

In a device in accordance with these embodiments of the invention, each second circuit is connected to at least one thermal regulation loop of the vehicle via a multi-way valve—in particular a three-way valve—having an outlet connected to the second circuit, a first inlet connected to a first heat transfer fluid bleed point of a thermal regulation loop of the vehicle and at least one second inlet—in particular a single second inlet—connected to a second heat transfer fluid bleed point of a thermal regulation loop of the vehicle, the second bleed point being suitable for being able to deliver heat transfer fluid at a temperature different from the temperature of the heat transfer fluid which can be delivered by the first bleed point. Furthermore, advantageously and in accordance with the invention the first bleed point and each second bleed point are separate bleed points of a same thermal regulation loop of the vehicle.

In particular, in some embodiments at least one—in particular each—multi-way valve is a three-way valve having a first inlet connected to a first heat transfer fluid bleed point and a second inlet connected to a second heat transfer fluid bleed point and an outlet connected to either one of its two inlets.

In some embodiments, advantageously and in accordance with the invention each multi-way valve—in particular each three-way valve—is controlled in a mode of control named alternate control, i.e. such that in the open position of the valve its outlet is connected to either one of its inlets and to only one of its inlets. Therefore, in the open position the valve delivers all or some of the incoming flow into either one, and only one, of its inlets. However, it should be noted that each multi-way valve is preferably a proportional valve, i.e. that in the open position the flow delivered by the outlet can be adjusted depending upon the opening position of the valve. In the closed position, the valve does not deliver any flow.

Advantageously and in accordance with the invention, the first bleed point and the second bleed point are two separate bleed points for a same heat transfer fluid at two distinct temperatures of a same thermal regulation loop of the vehicle. In fact, a low-temperature heat transfer fluid and a high-temperature heat transfer fluid suffice to individually adjust the temperature of the air supplying a cabin.

However, there is nothing to prevent, as a variant, provision being made that each second circuit can be supplied by more than two separate bleed points of heat transfer fluid, i.e. at more than two different temperatures, from one and the same thermal regulation loop of the vehicle, or in contrast from a plurality of separate thermal regulation loops of the vehicle. This variant allows in particular the thermal control of the cabins to be maintained in the event of unavailability of a heat transfer fluid bleed point on a thermal regulation loop, either owing to a malfunction in this thermal regulation loop, or more generally to avoid such bleeding to the detriment of the performances of the thermal regulation loop (for example in some usage conditions of the vehicle, in particular in some flight envelopes when the vehicle is an aircraft).

In particular, in some embodiments of the invention, each thermal regulation loop of the vehicle can advantageously be a monophasic heat transfer fluid thermal regulation loop ("monophasic" meaning that the fluid remains in the same physical state (liquid or gas) at any point in the loop). Such a monophasic heat transfer fluid can be selected in particular from a heat transfer liquid and air.

In some advantageous embodiments of the invention, at least one thermal regulation loop in which the heat transfer fluid is used to supply at least one individual exchanger can be in particular a loop for cooling electronic equipment of the vehicle, for example electronic power circuits. It should be noted that there is nothing to prevent provision being made that a plurality of—in particular all—the second circuits of a plurality—in particular all—the individual exchangers are supplied from one and the same thermal regulation loop of the vehicle. However, there is nothing to prevent the provision of at least one individual exchanger in which the second circuit is supplied with a first heat transfer fluid from a first thermal regulation loop and at least one other individual exchanger in which the second circuit is supplied with a second heat transfer fluid from a second thermal regulation loop separate from said first thermal regulation loop.

The individual adjustment of the temperature in either direction (individually heating or cooling from the temperature of the air delivered by the mixing chamber) of the air supplying each cabin of the vehicle in a method and a device in accordance with the invention allows, in practice, the energy consumption caused by the thermal control of the different cabins of the vehicle to be optimised. The logic implemented to control the temperature of the air in the mixing chamber and to effect this individual temperature adjustment can be subject to a large number of embodiment variants.

For example, in some possible embodiments of the invention, the temperature of the air delivered to the mixing chamber by each air supply device is determined based on a minimum value of the thermal gain needs of the different cabins of the vehicle. This minimum value can be determined in particular by the smallest difference, in absolute value, between at least one air temperature measured for a cabin and said set temperature for this cabin. In corresponding embodiments of a device in accordance with the invention, said automatic thermal management arrangement is suitable for determining a minimum value of the thermal gain needs of the different cabins of the vehicle, and for controlling the temperature of the air delivered to the mixing chamber by each air supply device based on this minimum value. In particular, since each cabin is provided with at least one sensor for measuring an air temperature for this cabin, said automatic thermal management arrangement is suitable for controlling the temperature of the air delivered to the mixing chamber by each air supply device based on the smallest difference, in absolute value, between a temperature measured for a cabin and said set temperature for this cabin.

Said air temperature measured for each cabin used for determining said smallest difference, i.e. the cabin having the lowest thermal gain need, can be selected from a temperature of the air supplying said cabin and a temperature of the air within said cabin. When said set temperature for the cabin is a set temperature of the air supplying the cabin, said measured air temperature is also the temperature of the air supplying this cabin. When said set temperature for the cabin is a set temperature of the air within the cabin, said measured air temperature is also the measured temperature within this cabin.

Other variants are possible, e.g. by controlling the temperature of the air delivered to the mixing chamber by each air supply device based on an average value of thermal gain needs of different cabins and/or based on an average value of set temperature for different cabins and/or based on average values of measured temperature for different cabins.

The outlet air of the mixing chamber thus allows the temperature of a cabin to be controlled without being individually adjusted, said cabin being the one requiring the lowest thermal gain, i.e. having the smallest difference, in absolute value, between said measured temperature for the cabin and said set temperature for this cabin. The temperature of the air supplying such a cabin requiring the lowest thermal gain does not need to be individually adjusted such that if this cabin is supplied via an individual exchanger, the supply of the second circuit of this individual exchanger can be closed with no heat transfer fluid circulating in this second circuit. In some embodiments, the supply conduit specific to each cabin requiring the lowest thermal gain can be free of individual exchangers if this cabin is always the same, regardless of the operating conditions of the vehicle.

The invention also relates to a vehicle—in particular an aircraft—comprising at least one plurality of cabins, at least one device for thermally controlling each plurality of cabins and at least one heat transfer fluid thermal regulation loop, characterised in that it comprises at least one thermal control device in accordance with the invention. It likewise relates to a vehicle in which a thermal control method in accordance with the invention is implemented.

The invention likewise relates to a thermal control method, a thermal control device and a vehicle which are characterised in combination by all or some of the features mentioned above or below.

Figure 2:
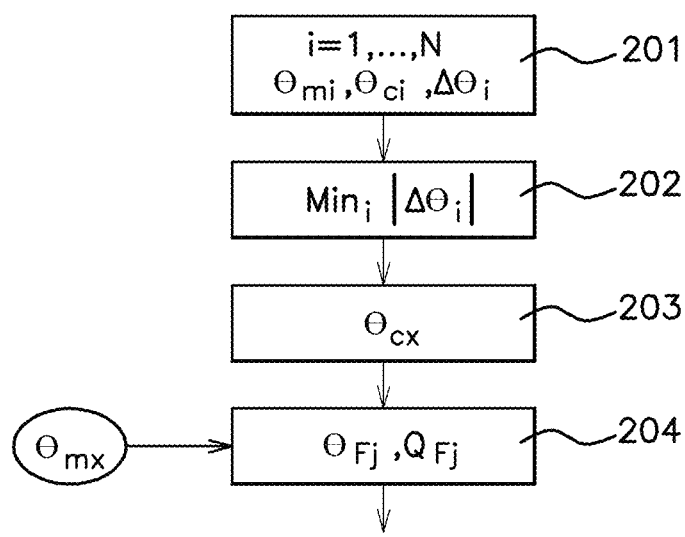
Figure 3:
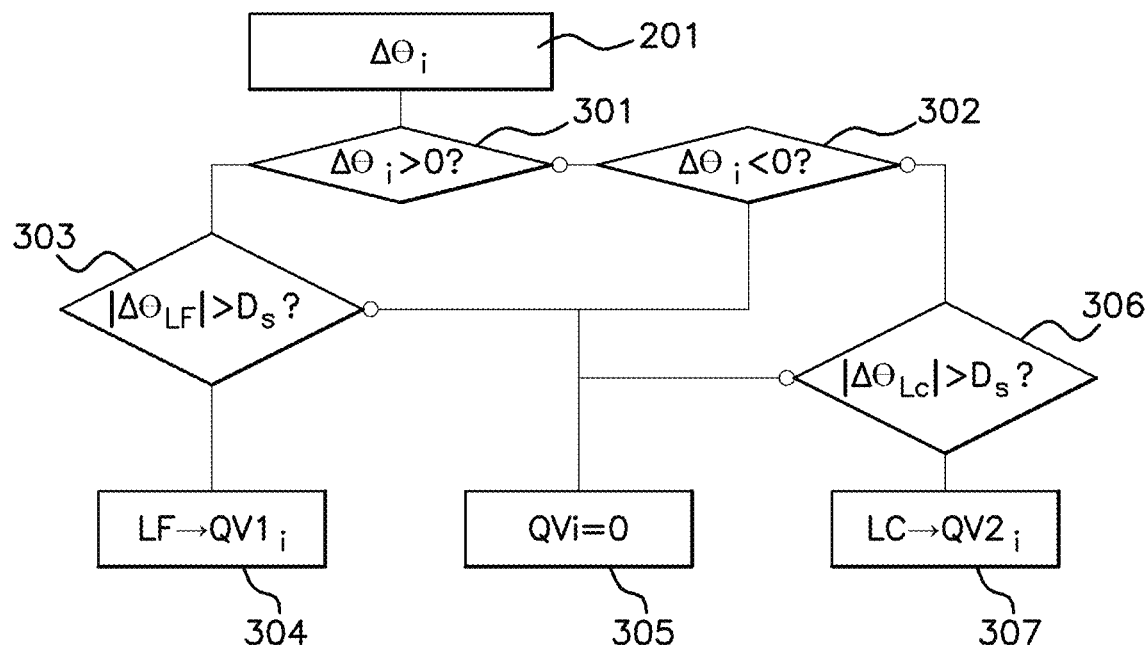

Other aims, features and advantages of the invention will become apparent upon reading the following description given by way of non-limiting illustrative example and which makes reference to the attached figures in which:

FIG. 1 is a diagram showing an example of an embodiment of a thermal control device in accordance with the invention, FIG. 2 is an example of a general algorithm implemented in a method in accordance with the invention, FIG. 3 is an example of an algorithm implemented in a method in accordance with the invention for supplying a second circuit of an individual exchanger.

An example of a thermal control device in accordance with the invention of an aircraft 11 is shown in FIG. 1. This device comprises a mixing chamber 12 supplied by different air flows, this mixing chamber 12 allowing different cabins 13 to 18 of the aircraft 11 to be individually supplied by different air flows.

The mixing chamber 12 is supplied in particular by two temperature-controlled air supply devices 19, 20, each of these air supply devices 19, 20 being, for example, an air cycle machine environmental control module (ECS). Each air supply device 19, 20 has an outlet 21, 22 respectively, connected to an inlet 23, 24 respectively of the mixing chamber 12 by a conduit 25, 26 respectively, provided with a temperature sensor 27, 28 respectively, for the air delivered to the outlet 21, 22.

In the illustrated example, a first device 19 comprises a turbocompressor comprising a compressor coupled to a turbine and to a fan, the compressor receiving air from the external environment and/or from any other available air source, compressing it to deliver it to an intermediate exchanger in which it is cooled prior to its passage into a water extraction loop, then to the inlet of the turbine, this latter delivering—in cooling mode—a cooled air flow to the mixing chamber 12. In heating mode, the heated compressed air flow provided by the compressor can be delivered directly to the outlet of the device 19 in the mixing chamber 12. The second temperature-controlled air supply device 20 shown is similar to the first device 19 except that an electric motor is interposed between the compressor and the turbine in order to be able to drive the latter.

It goes without saying that any other embodiment variants of such temperature-controlled air supply devices can be used within the scope of the present invention. In particular, there is nothing to prevent the provision of one (or more) air supply device(s) operating only in heating mode (for example a compressor motor or heat pump) and/or one (or more) air supply device(s) operating only in cooling mode (i.e. for air-conditioning) and/or one (or more) air supply device(s) comprising at least one diphasic (liquid/vapour) heat transfer fluid thermal regulation loop and/or one (or more) air supply device(s) comprising at least one monophasic heat transfer liquid thermal regulation loop.

Each temperature-controlled air supply device 19, 20 is controlled by an automatic thermal management arrangement (not shown) receiving the signals delivered by each temperature measuring sensor and generally comprising in particular a closed-loop control of the temperature of the air at the outlet of the device 19, 20 based on the required temperature, further determined by the automatic thermal management arrangement. The general features of such an automatic thermal management arrangement (formed of an on-board computer of the vehicle and its different interfaces with the components it controls: valves, temperature sensors, motors, compressors, pumps . . . ) and its different possible programming modes are well known in themselves and do not need to be described in detail, only its features specific to the present invention being described hereinafter.

The mixing chamber 12 is likewise supplied in general with recirculation air from at least one of the cabins 13 to 18 by at least one recirculation conduit 29. It can also be supplied with any other available air flow on board the aircraft 11 and in particular with any other air flow allowing thermal energy to be recovered and/or optionally with cold air from the outside.

A temperature sensor 30 connected to the automatic thermal management arrangement allows the temperature of the mixing air within the mixing chamber 12 to be measured.

The aircraft 11 further comprises at least one monophasic heat transfer liquid thermal regulation loop 31, 51 arranged and suitable for thermally controlling on-board equipment on the aircraft 11 other than the cabins 13 to 18 themselves. Such a monophasic heat transfer liquid thermal regulation loop is in general separate from each temperature-controlled air supply device 19, 20 and independent of these air supply devices 19, 20 in the sense that it does not form a hot source nor a cold source for these devices 19, 20.

In the illustrated example, the aircraft 11 comprises two monophasic heat transfer liquid thermal regulation loops 31, 51.

A first loop 31 comprises a heat transfer liquid reservoir 33, a pump 34, a heat exchanger, named cooling exchanger 35, associated with a hot source 32 to be cooled formed e.g. of on-board electronic power equipment, and two cold sources allowing the heat transfer liquid to be cooled, i.e. a heat exchanger 36, named skin heat exchanger, i.e. receiving the air outside of the vehicle (e.g. air at ram air pressure under the effect of movement of the vehicle) and a heat exchanger 37 used as an evaporator in a diphasic heat transfer fluid thermal regulation loop (VCS) 40.

This diphasic cycle loop 40 comprises, for example, a compressor 38 providing the fluid in gaseous state to a heat exchanger 39 used as a condenser, e.g. associated with the air outside of the vehicle as a cold source, a fluid reservoir 41 and an expansion valve 42 supplying the evaporator 37, the outlet of which supplies the compressor 38. It goes without saying that a diphasic cycle loop 40 can be subject to a large number of embodiment variants.

The second monophasic heat transfer liquid thermal regulation loop 51 is similar to the first loop 31 but comprises an additional cold source in the form of a heat exchanger, named recirculation exchanger 52, associated with the recirculation conduit 29 to cool the recirculation air from at least one cabin of the aircraft 11 prior to being supplied in the mixing chamber 12.

This second monophasic heat transfer liquid thermal regulation loop 51 comprises a heat transfer liquid reservoir 53, a pump 54, a heat exchanger, named cooling exchanger 55, associated with a hot source 58 to be cooled formed e.g. of on-board electronic power equipment, and three cold sources allowing the heat transfer liquid to be cooled, i.e. in addition to the recirculation exchanger 52, a heat exchanger 56, named skin heat exchanger 56, i.e. receiving the air outside of the vehicle (e.g. air at ram air pressure under the effect of movement of the vehicle) and a heat exchanger 57 used as an evaporator in a diphasic heat transfer fluid thermal regulation loop (VCS) 60.

This diphasic cycle loop 60 is similar to the diphasic cycle loop 40 associated with the first monophasic heat transfer liquid thermal regulation loop 31.

Furthermore, a bypass conduit 59 allows the direct connection of the outlet of the recirculation exchanger 52 upstream of the pump 54, at least some of the flow of monophasic heat transfer liquid not circulating in the cooling exchanger 55 nor in the skin heat exchanger 56. A valve 61 controlled by the automatic thermal management arrangement is interposed on this bypass conduit 59 in order to adjust the flow of liquid passing through the bypass conduit 59. This bypass conduit 59 ensures that the flow of liquid into the cooling exchanger 55 is not too high, taking into account the fact that furthermore the necessary liquid flow to the recirculation exchanger 52 is in general higher than that necessary in the cooling exchanger 55.

A first cabin 13 (e.g. the cockpit of the aircraft 11) is connected to the mixing chamber 12 by an air supply conduit 63 specific to this cabin 13 via a first circuit of an air/liquid heat exchanger, named individual exchanger 64. Any heat exchanger allows heat to be transferred between its first circuit and its second circuit, as a function of the difference in temperature of the flows respectively passing through these two circuits. The individual exchanger 64 thus has a second circuit supplied from a three-way valve 65 with heat transfer liquid bled from the first monophasic heat transfer liquid thermal regulation loop 31.

The three-way valve 65 is controlled by the automatic thermal management arrangement and has a first inlet connected to a first hot bleed node 66 of the loop 31 downstream of the cooling exchanger 35 allowing the heat transfer liquid to be bled at a relatively high temperature. The three-way valve 65 has a second inlet connected to a second cold bleed node 67 upstream of the cooling exchanger 35 allowing the heat transfer liquid to be bled at a relatively low temperature.

The three-way valve 65 has an outlet connected to the inlet of the second circuit of the individual exchanger 64. The outlet of this second circuit is connected to a node 72 of the first thermal regulation loop 31 to recycle the heat transfer liquid into this loop, preferably immediately upstream of the pump 34. A temperature sensor 73 allows the temperature at this node 72 to be measured.

Therefore, the second circuit of the individual exchanger 64 can be supplied, controlled by the automatic thermal management arrangement, either with high-temperature heat transfer liquid for heating the air supplied to the cabin 13, or with low-temperature heat transfer liquid for cooling the air supplied to the cabin 13. A temperature sensor 68 allows the temperature of the liquid at the first node 66 to be measured. A temperature sensor 69 allows the temperature at the second node 67 to be measured. A temperature sensor 70 allows the temperature of the air at the inlet of the first cabin 13 to be measured and a temperature sensor 71 allows the temperature within the first cabin 13 to be measured.

The automatic thermal management arrangement controls in particular the three-way valve 65 based on the temperature of the air in the mixing chamber 12 measured by the sensor 30, on different temperature measurements delivered by the different temperature sensors, and on a set temperature adjusted by the crew of the aircraft 11, e.g. using a thermostat specific to the first cabin 13.

A second cabin 14 which is e.g. a passenger cabin is connected to the mixing chamber 12 by an air supply conduit 74 specific to this cabin 14 via a first circuit of an air/liquid heat exchanger, named individual exchanger 75. The individual exchanger 75 has a second circuit supplied, like the air/liquid exchanger 64 of the supply conduit 63 specific to the first cabin 13, from a three-way valve 76 with heat transfer liquid likewise bled from the first monophasic heat transfer liquid thermal regulation loop 31. The three-way valve 76 is controlled by the automatic thermal management arrangement and has a first inlet connected to the first hot bleed node 66 of the loop 31 and a second inlet connected to the second cold bleed node 67, allowing the heat transfer liquid to be bled either at a relatively high temperature or at a relatively low temperature.

The three-way valve 76 has an outlet connected to the inlet of the second circuit of the individual exchanger 75. The outlet of this second circuit is connected to the node 72 of the first thermal regulation loop 31 to recycle the heat transfer liquid into this loop.

A temperature sensor 77 allows the temperature of the air at the inlet of the second cabin 14 to be measured and a temperature sensor 78 allows the temperature within the second cabin 14 to be measured. The automatic thermal management arrangement controls in particular the three-way valve 76 based on the temperature of the air in the mixing chamber 12 measured by the sensor 30, on different temperature measurements delivered by the different temperature sensors, and on a set temperature adjusted by the crew of the aircraft 11, e.g. using a thermostat specific to the second cabin 14.

A third cabin 15 which is e.g. likewise a passenger cabin is connected to the mixing chamber 12 by an air supply conduit 85 specific to this cabin 15 via a first circuit of an air/liquid heat exchanger, named individual exchanger 86. The individual exchanger 86 has a second circuit supplied from a three-way valve 87 with heat transfer liquid bled either from the first monophasic heat transfer liquid thermal regulation loop 31 or from the second monophasic heat transfer liquid thermal regulation loop 51. The three-way valve 87 is controlled by the automatic thermal management arrangement and has a first inlet connected to the first hot bleed node 66 of the first loop 31 downstream of the cooling exchanger 35 allowing the heat transfer liquid to be bled at a relatively high temperature. The three-way valve 87 has a second inlet connected to a second cold bleed node 88 of the second loop 51 upstream of the cooling exchanger 55 allowing the heat transfer liquid to be bled at a relatively low temperature. Thus, the second circuit of the individual exchanger 86 is supplied sometimes with high-temperature liquid from the first loop 31 and sometimes with low-temperature liquid by the second loop 51. In fact, this second loop 51 has better cooling capabilities which may be used in a greater number of individual exchangers than the first loop 31 to adjust the temperature of each cabin of an aircraft 11 in cooling mode.

The three-way valve 87 has an outlet connected to the inlet of the second circuit of the individual exchanger 64. The outlet of this second circuit is connected by an outlet three-way valve 89 either to the node 72 of the first thermal regulation loop 31 to recycle the heat transfer liquid into this loop 31, or to the node 90 of the second thermal regulation loop 51 to recycle the heat transfer liquid into this loop 51. The automatic thermal management arrangement controls the outlet three-way valve 89 to recycle the heat transfer liquid into the first thermal regulation loop 31 when it is bled from this first loop 31, and into the second thermal regulation loop 51 when the heat transfer liquid is bled from this second loop 51. A temperature sensor 91 allows the temperature of the heat transfer liquid at the second bleed node 88 of the second loop 51 to be measured. A temperature sensor 92 allows the temperature at the node 90 of the second loop 51 to which the outlet three-way valve 89 is connected to be measured. A temperature sensor 93 allows the temperature of the air at the inlet of the third cabin 15 to be measured and a temperature sensor 94 allows the temperature within the third cabin 15 to be measured.

The automatic thermal management arrangement controls in particular the three-way valves 87, 89 based on the temperature of the air in the mixing chamber 12 measured by the sensor 30, on different temperature measurements delivered by the different temperature sensors, and on a set temperature adjusted by the crew of the aircraft 11, e.g. using a thermostat specific to the third cabin 15.

A fourth cabin 16, which is e.g. a hold of the aircraft 11, is connected directly to the mixing chamber 12 by an air supply conduit 96 specific to this cabin 16 so as to be supplied with air at the temperature of the air exiting the mixing chamber 12. This air supply conduit 96 is thus free of an air/liquid exchanger, the temperature of the air delivered into the fourth cabin 16 not needing to be individually adjusted. Preferably, this fourth cabin 16 is the cabin of the aircraft which has the lowest thermal gain needs, in terms of heating and also in terms of cooling. A temperature sensor 97 allows the temperature of the air at the inlet of the fourth cabin 16 to be measured. A temperature sensor 98 allows the temperature within the fourth cabin 16 to be measured. Thus, the automatic management arrangement can control the supply devices 19, 20 of the mixing chamber 12 with temperature-controlled air only as a function of the thermal gain needs of this fourth cabin 16 in an optimum manner in terms of the energy consumption of these air supply devices 19, 20. The automatic management arrangement can thus be adapted to control the temperature within the mixing chamber 12 to a set temperature in this fourth cabin 16 adjusted by the crew of the aircraft 11, e.g. using a thermostat specific to the fourth cabin 16.

A fifth cabin 17 which is e.g. a passenger cabin is connected to the mixing chamber 12 by an air supply conduit 107 specific to this cabin 17 via a first circuit of an air/liquid heat exchanger, named individual exchanger 108. The individual exchanger 108 has a second circuit supplied from a four-way valve 109 with heat transfer liquid bled from the second monophasic heat transfer liquid thermal regulation loop 51. The four-way valve 109 is controlled by the automatic thermal management arrangement and has a first inlet connected to a first hot bleed node 110 of the second loop 51 downstream of the cooling exchanger 55 allowing the heat transfer liquid to be bled at a relatively high temperature. The four-way valve 109 has a second inlet connected to the second cold bleed node 88 of the second loop 51 upstream of the cooling exchanger 55 allowing the heat transfer liquid to be bled at a relatively low temperature. The four-way valve 109 has a third inlet connected to a third intermediate temperature bleed node 111 of the second loop 51 between the evaporator 57 and the recirculation exchanger 52 allowing the heat transfer liquid to be bled at an intermediate temperature between that of the first node 110 and that of the second node 88.

The four-way valve 109 has an outlet connected to the inlet of the second circuit of the individual exchanger 108. The outlet of this second circuit is connected to the node 90 of the second thermal regulation loop 51 to recycle the heat transfer liquid into this loop 51.

A temperature sensor 112 allows the temperature of the air at the inlet of the fifth cabin 17 to be measured and a temperature sensor 113 allows the temperature within the fifth cabin 17 to be measured. The automatic thermal management arrangement controls in particular the four-way valve 109 based on the temperature of the air in the mixing chamber 12 measured by the sensor 30, on different temperature measurements delivered by the different temperature sensors, and on a set temperature adjusted by the crew of the aircraft 11, e.g. using a thermostat specific to the fifth cabin 17.

A sixth cabin 18 which is e.g. a passenger cabin is connected to the mixing chamber 12 by an air supply conduit 118 specific to this cabin 18 via a first circuit of an air/liquid heat exchanger, named individual exchanger 119. The individual exchanger 119 has a second circuit supplied from a four-way valve 120 with heat transfer liquid bled from the second monophasic heat transfer liquid thermal regulation loop 51. This four-way valve 120 is controlled by the automatic management arrangement and is connected to the second thermal regulation loop 51 like the four-way valve 109 supplying the individual exchanger 108 of the fifth cabin 17.

A temperature sensor 121 allows the temperature of the air at the inlet of the sixth cabin 18 to be measured and a temperature sensor 122 allows the temperature within the sixth cabin 18 to be measured. The automatic thermal management arrangement controls in particular the four-way valve 120 based on the temperature of the air in the mixing chamber 12 measured by the sensor 30, on different temperature measurements delivered by the different temperature sensors, and on a set temperature adjusted by the crew of the aircraft 11, e.g. using a thermostat specific to the sixth cabin 18.

Each individual exchanger is selected in particular based on the type of heat transfer fluid supplying the second circuit of this individual exchanger. The exchanger can be an air/air exchanger as described for example in U.S. Pat. No. 3,601,185 or the like; or the exchanger can be an air/liquid exchanger as described for example in EP 0440400 or U.S. Pat. No. 4,327,802 or the like.

An example of some specific steps of a thermal control method in accordance with the invention implemented by an automatic thermal management arrangement of a thermal control device in accordance with the invention is shown in FIGS. 2 and 3. General features not specific to the invention of a thermal control method and an automatic thermal management arrangement of cabins of a vehicle well known in themselves are not described in detail.

FIG. 2 shows in particular an example of control logic of the devices 19, 20 for supplying air to the mixing chamber which can be implemented in a method in accordance with the invention.

It is assumed that the vehicle comprises a number N of cabins represented hereinafter and in FIGS. 2 and 3 by the subscript i.

In step 201, for the different cabins i, i.e. for i=1, ..., N, a temperature error $\Delta\theta i$ between a set temperature $\theta ci$ for this cabin and a measured temperature Omi for this cabin is calculated. The set temperature $\theta ci$ can be a set temperature within the cabin, adjusted by a user by actuating a setting adjustment command, or a calculated set temperature, for example a calculated set temperature of the air supplying the cabin, itself calculated based on the temperature measured in the cabin, on the set temperature within the cabin adjusted by a user, and optionally on other parameters. Similarly, the measured temperature $\theta mi$ can be the temperature measured within the cabin or a measured temperature of the air supplying the cabin.

In step 202, the minimum value $Min_i|\Delta\theta i|$ for the different cabins i of the absolute value of this temperature error is determined.

Based on this minimum value, a set temperature $\theta cx$ of the air in the mixing chamber (or at the outlet of this chamber) can be determined in step 203 in accordance with a temperature control law such as a PID (proportional-integral-derivative) control law.

From this set temperature $\theta cx$ of the air in the mixing chamber and from the measured temperature $\theta mx$ of the air in the mixing chamber (or at the outlet of this chamber), the operation of each air supply device 19, 20 is controlled in step 204 and in a manner known per se, in particular to deliver an air flow QFj at a temperature ° Fj, j being the subscript representing the different air supply devices (being equal to 1 or 2 in the example shown in FIG. 1).

FIG. 3 shows an example of control logic for a three-way valve in a method in accordance with the invention for individually adjusting the temperature of the air supplying a cabin i.

The temperature error $40i$ determined in step 201 is compared with the zero value in two tests 301 and 302 (which may of course be grouped together into one single logic test). In the first test 301, it is determined whether $\Delta\theta i>0$. If this is the case, this means that the cabin i should be cooled. In a subsequent test 303, it is then examined whether or not the difference $\Delta\theta LF=\theta LF-\theta mx$ between the temperature $\theta LF$ of the heat transfer liquid at the cold bleed node connected to the valve and the measured temperature $\theta mx$ of the air from the mixing chamber is, in absolute value, greater than a predetermined threshold value Ds, e.g. of the order of 5° C., i.e. $|\Delta\theta LF|>Ds$. If this is the case, the inlet of the valve connected to this cold bleed node is opened in step 304 such that the valve supplies the second circuit of the individual exchanger of the cabin i with a flow $QV1i$ of cold heat transfer liquid. If this is not the case, the valve is closed in step 305, the flow QVi delivered by this valve being zero, the temperature of the cabin i not being individually adjusted.

If test 301 determines that the condition $\Delta\theta i>0$ is not met, it is determined in a second test 302 whether $\Delta\theta i<0$. If this condition is met, this means that the cabin i should be heated. In a subsequent test 306, it is then examined whether or not the difference $\Delta\theta LC=\theta LC-\theta mx$ between the temperature $\theta LC$ of the heat transfer liquid at the hot bleed node connected to the valve and the measured temperature $\theta mx$ of the air from the mixing chamber is, in absolute value, greater than a predetermined threshold value Ds, e.g. of the order of 5° C., i.e. $|\Delta\theta LC|>Ds$. If this is the case, the inlet of the valve connected to this hot bleed node is opened in step 307 such that the valve supplies the second circuit of the individual exchanger of the cabin i with a flow $QV2i$ of hot heat transfer liquid. If this is not the case, the valve is closed in step 305, the flow QVi delivered by this valve being zero, the temperature of the cabin i not being individually adjusted.

If test 302 determines that the condition $\Delta\theta i<0$ is also no longer met, the valve is closed in step 305, the flow QVi delivered by this valve being zero, the temperature of the cabin i not being individually adjusted.

In particular, in a method in accordance with the invention, the second circuit of an individual exchanger 64, 75, 86, 108, 119 is supplied with a heat transfer liquid if and only if the temperature of this heat transfer liquid is different from the temperature of the air circulating in the first circuit of the individual exchanger 64, 75, 86, 108, 119, i.e. the air at the outlet of the mixing chamber 12 which is greater, in absolute value, than a predetermined threshold value Ds which is preferably greater than 1° C., e.g. between 2° C. and 10° C., in particular of the order of 5° C. If this condition is not met, the second circuit of the individual exchanger is not supplied and the temperature of the air supplying the corresponding cabin is not individually adjusted.

The invention can cover many embodiment variants with respect to the examples shown and described above. The type and number of the monophasic heat transfer liquid thermal regulation loops and the manner of connecting at least one of these loops to heat exchangers for individually adjusting the temperature in each cabin can be varied in many ways. Furthermore, there is nothing to prevent the provision of a plurality of individual exchangers interposed (in parallel or in series) on a single supply conduit specific to a cabin. There is likewise nothing to prevent the provision of a plurality of supply conduits free of individual exchangers or, in contrast, that all the supply conduits of the different cabins are equipped with at least one such individual exchanger. The control logic for supplying each second circuit of each individual exchanger can be varied in many suitable ways.

The invention is advantageously applicable to the thermal control of cabins of an aircraft such as an airliner. Nevertheless, it can likewise be applied to any other vehicles in which the same problem arises, e.g. trains, ships . . . . A vehicle in accordance with the invention can be equipped with a single thermal control device in accordance with the invention or, in contrast, a plurality of thermal control devices in accordance with the invention.

The invention claimed is:

1. Method for thermally controlling a temperature of the air within a plurality of cabins of a vehicle, the vehicle having a mixing chamber supplied with air from at least one air supply device, said method comprising the steps of:
supplying each cabin with air:
from the mixing chamber,
by a supply conduit specific to said cabin,
independently of the other cabins,
wherein:
supplying at least one cabin of plurality of cabins (13 to 18) with air at a temperature adjusted by at least one heat exchanger, named individual exchanger, associated with said supply conduit specific to said cabin,
passing air from the mixing chamber through a first circuit of each individual exchanger associated with said supply conduit specific to said cabin and independently supplying said cabin, this first circuit being interposed between said cabin and the mixing chamber on said supply conduit specific to said cabin,
supplying at least one second circuit of at least one individual exchanger associated with a supply conduit specific to said cabin with a heat transfer fluid from at least one thermal regulation loop of the vehicle,
said heat transfer fluid being selected:
from:
at least one said heat transfer fluid bled from said thermal regulation loop of the vehicle at a temperature greater than the temperature of the air from the mixing chamber, and
at least one said heat transfer fluid bled from said thermal regulation loop of the vehicle at a temperature lower than the temperature of the air from the mixing chamber,
such that each individual exchanger associated with the supply conduit specific to said cabin individually adjusts the temperature of the air supplying said cabin based on a set temperature for said cabin,
wherein said heat transfer fluid is selected from:
at least one said heat transfer fluid that is bled from said thermal regulation loop of the vehicle at a temperature greater than the temperature of the air from the mixing chamber when said set temperature is greater than the temperature of the air from the mixing chamber, and
at least one said heat transfer fluid that is bled from said thermal regulation loop of the vehicle at a temperature lower than the temperature of the air from the mixing chamber when said set temperature is lower than the temperature of the air from the mixing chamber.

2. Method according to claim 1, wherein the said heat transfer fluid is selected such that each individual exchanger associated with the supply conduit specific to said cabin individually adjusts the temperature of the air supplying said cabin based on a set temperature which is a set temperature of the air supplying said cabin.

3. Method according to claim 1, wherein said selected heat transfer fluid is a monophasic heat transfer fluid bled from said thermal regulation loop.

4. Method according to claim 3, wherein said heat transfer fluid is for cooling electronic equipment of the vehicle.

5. Method according to claim 1, wherein each second circuit is supplied with said heat transfer fluid via a multi-way valve having an outlet connected to the second circuit, a first inlet connected to a first heat transfer fluid bleed point of said thermal regulation loop of the vehicle and at least one second inlet connected to a second heat transfer fluid bleed point of said thermal regulation loop of the vehicle, the second bleed point being suitable for being able to deliver said heat transfer fluid at a temperature different from the temperature of said heat transfer fluid which can be delivered by the first bleed point.

6. Method according to claim 5, wherein each second circuit is supplied with said heat transfer fluid via said three-way valve having two inlets connected to two separate bleed points for said heat transfer fluid at distinct temperatures, and an outlet connected to either one of its two inlets.

7. Method according to claim 1, wherein said selected heat transfer fluid is a monophasic heat transfer fluid bled from said thermal regulation loop.

8. Method according to claim 2, wherein said selected heat transfer fluid is a monophasic heat transfer fluid bled from said thermal regulation loop.

9. Method according to claim 1, wherein said selected heat transfer fluid is bled from a monophasic heat transfer liquid thermal regulation loop for cooling electronic equipment of the vehicle.

10. Method according to claim 2, wherein said selected heat transfer fluid is bled from a monophasic heat transfer liquid thermal regulation loop for cooling electronic equipment of the vehicle.

11. Method according to claim 3, wherein said selected heat transfer fluid is bled from a monophasic heat transfer liquid thermal regulation loop for cooling electronic equipment of the vehicle.

12. Method according to claim 1, each second circuit is supplied with said heat transfer fluid via a multi-way valve having an outlet connected to the second circuit, a first inlet connected to a first heat transfer fluid bleed point of said thermal regulation loop of the vehicle and at least one second inlet connected to a second heat transfer fluid bleed point of said thermal regulation loop of the vehicle, the second bleed point being suitable for being able to deliver said heat transfer fluid at a temperature different from the temperature of said heat transfer fluid which can be delivered by the first bleed point.

13. Method according to claim 2, each second circuit is supplied with said heat transfer fluid via a multi-way valve having an outlet connected to the second circuit, a first inlet connected to a first heat transfer fluid bleed point of said thermal regulation loop of the vehicle and at least one second inlet connected to a second heat transfer fluid bleed point of said thermal regulation loop of the vehicle, the second bleed point being suitable for being able to deliver said heat transfer fluid at a temperature different from the temperature of said heat transfer fluid which can be delivered by the first bleed point.

14. Device for thermally controlling a plurality of cabins of a vehicle, comprising:
- a mixing chamber,
- at least one air supply device connected to the mixing chamber for supplying said mixing chamber with air at a controlled temperature,
- an automatic thermal management arrangement suitable for controlling at least the temperature of the air delivered by each air supply device to the mixing chamber based on at least one set temperature of at least one cabin of plurality of cabins of the vehicle,
- each cabin being connected to the mixing chamber by a supply conduit specific to said cabin so as to be able to be supplied with air from the mixing chamber independently of the other cabins, wherein:
- at least one heat exchanger, named individual exchanger, is associated with at least one said supply conduit specific to said cabin,
- each individual exchanger comprises:
  - a first circuit interposed between said cabin and the mixing chamber on said supply conduit specific to said cabin to be able to have air from the mixing chamber pass therethrough and to supply said cabin,
  - a second circuit connected to at least one heat transfer fluid thermal regulation loop of the vehicle to be able to be supplied with said heat transfer fluid,
- said automatic thermal management arrangement is suitable for supplying at least one said second circuit of at least one individual exchanger associated with a supply conduit specific to said cabin with said heat transfer fluid from at least one said thermal regulation loop of the vehicle,
- said automatic thermal management arrangement is suitable for selecting said heat transfer fluid:
  - from:
    - at least one said heat transfer fluid bled from said thermal regulation loop of the vehicle at a temperature greater than the temperature of the air from the mixing chamber when said set temperature is greater than the temperature of the air from the mixing chamber,
    - at least one said heat transfer fluid bled from said thermal regulation loop of the vehicle at a temperature lower than the temperature of the air from the mixing chamber when said set temperature is lower than the temperature of the air from the mixing chamber,
  - wherein said heat transfer fluid is selected such that each individual exchanger associated with the supply conduit specific to said cabin individually adjusts the temperature of the air supplying said cabin based on a set temperature for said cabin.

15. Device according to claim 14, wherein each second circuit is connected to at least one said thermal regulation loop of the vehicle via a multi-way valve having an outlet connected to the second circuit, a first inlet connected to a first heat transfer fluid bleed point of said thermal regulation loop of the vehicle, and at least one second inlet connected to a second heat transfer fluid bleed point of said thermal regulation loop of the vehicle, where the second bleed point being suitable for being able to deliver said heat transfer fluid at a temperature different from the temperature of said heat transfer fluid which can be delivered by the first bleed point.

16. Device according to claim 15, wherein the first bleed point and each second bleed point are separate bleed points of said thermal regulation loop of the vehicle.

17. Device according to claim 14, wherein at least one said thermal regulation loop of the vehicle connected to at least one said second circuit is a monophasic heat transfer fluid thermal regulation loop.

18. Device according to claim 14, wherein at least one said thermal regulation loop of the vehicle connected to at least one said second circuit is a monophasic heat transfer liquid thermal regulation loop for cooling equipment on board the vehicle.

19. Vehicle—in particular an aircraft—comprising at least one plurality of cabins, at least one device for thermally controlling each plurality of cabins according to claim 14 and at least one heat transfer fluid thermal regulation loop.

* * * * *